UNITED STATES PATENT OFFICE.

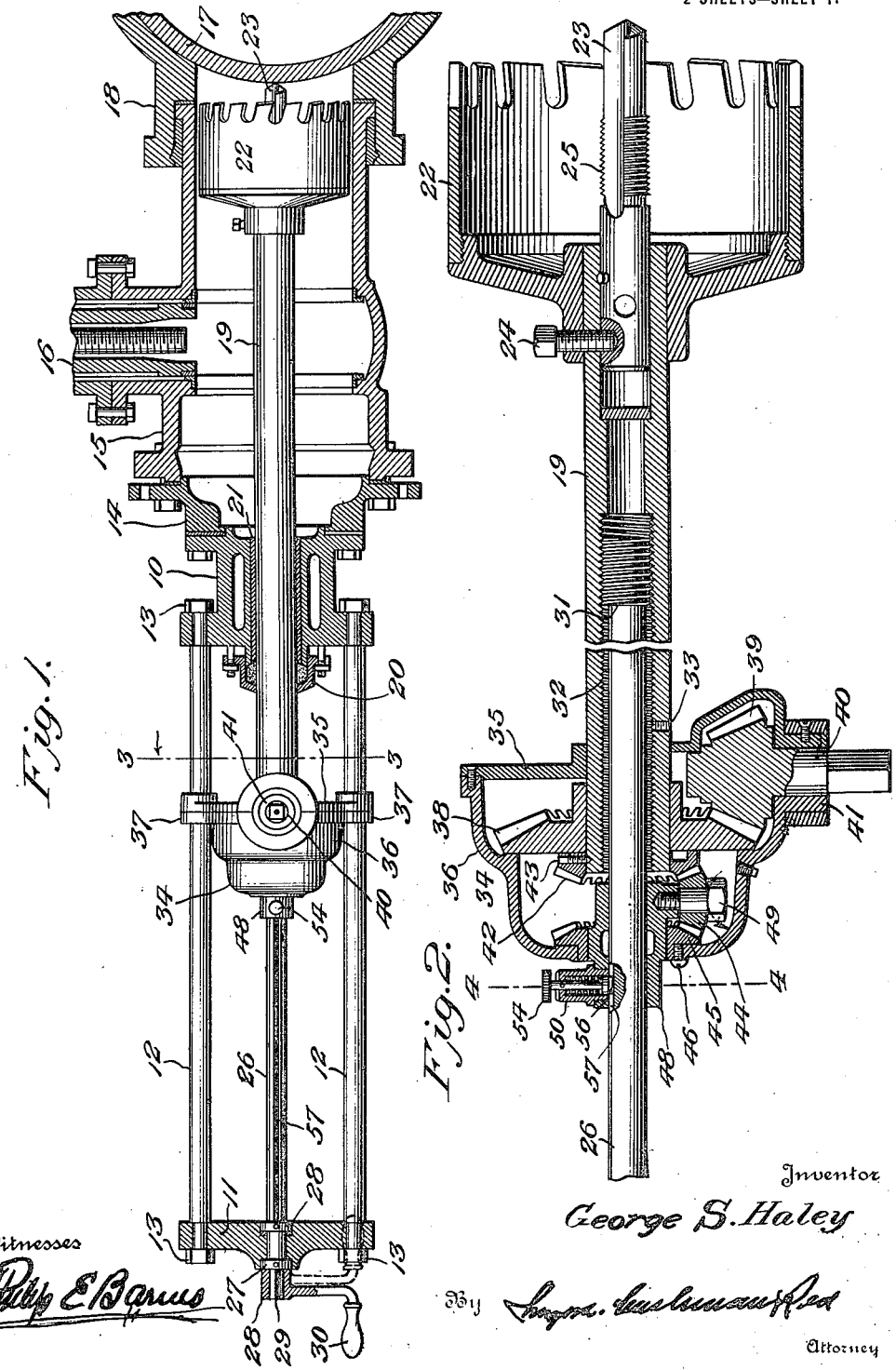

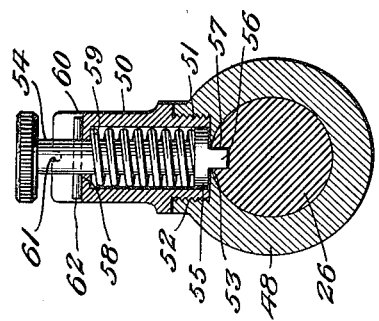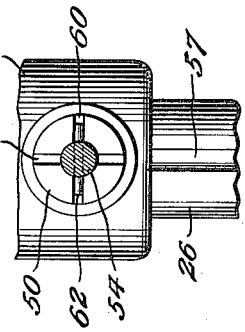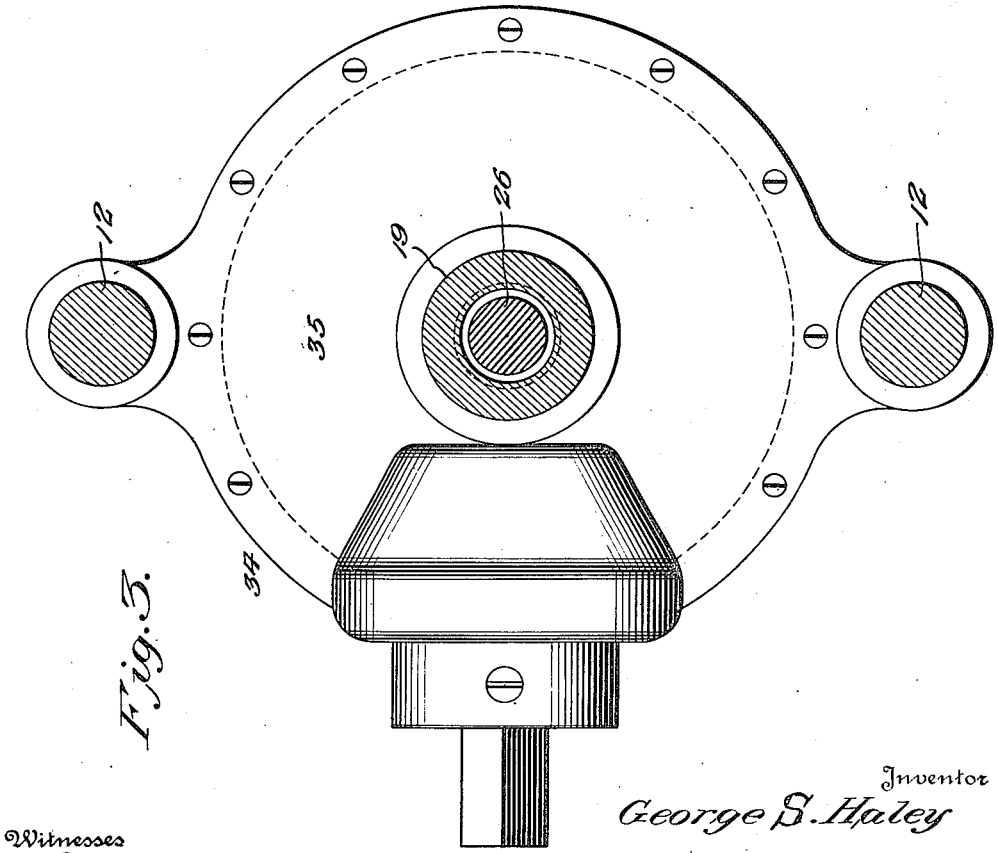

GEORGE S. HALEY, OF DUBUQUE, IOWA, ASSIGNOR TO H. MUELLER MANUFACTURING CO., OF DECATUR, ILLINOIS, A CORPORATION OF ILLINOIS.

TAPPING-MACHINE.

1,353,833.  Specification of Letters Patent.  Patented Sept. 28, 1920.

Application filed February 7, 1918. Serial No. 215,942.

*To all whom it may concern:*

Be it known that I, GEORGE S. HALEY, a citizen of the United States, and residing at Dubuque, in the county of Dubuque, and State of Iowa, have invented new and useful Improvements in Tapping-Machines, of which the following is a specification.

This invention relates to drilling or tapping machines for making lateral or branch connections in mains or pipes and has particular reference to mechanisms for feeding the cutting means forwardly toward and into the pipe.

In machines of this type, a circular shell cutter is employed and means are provided for rotating the shell cutter and advancing the same into the main operated upon so as to cut from the main or pipe a circular piece having the same diameter as that of the branch pipe which it is desired to connect to the main. A pilot drill, located centrally of the shell cutter and preferably having its bit end extending beyond the plane of the cutting edges of the teeth of the shell cutter, is employed for the purpose of centering the shell cutter and holding the latter steady and this pilot drill may have external threads which serve as a means for holding the circular piece cut from the pipe so that this piece will be withdrawn with the shell cutter after completion of the boring operation. During the boring operation, that is, while the cutter is cutting the circular piece from the main, owing to the large area of surface engaged by the teeth of the cutter, it is necessary that the cutter be fed slowly and at a constant rate of advance into the pipe in order that cutter may be rotated by nominal power.

To increase the efficiency of the machine by quickly bringing the cutter into engagement with the main, it is preferable, that preparatory to the cutting operation, the pilot drill and cutter be advanced at a relatively rapid rate of movement toward the main, and since friction between the pilot drill and the pipe is relatively small, the pilot drill may be fed rapidly into the work until the teeth of the cutter come into contact with the surface of the main, at which time the rate of advancement may be materially reduced.

The present invention has as its object to provide a feeding means for drilling or tapping machines which will permit of the above requisite rates of advancement of the shell cutter and drill. With the employment of the feeding means herein described the pilot drill and cutter may be manually advanced rapidly toward the pipe preparatory to the cutting operation and rapidly from the pipe after the pipe has been cut without rotating the boring bar which carries the cutter. After the pilot drill is brought into contact with the pipe the boring bar is automatically and positively advanced at a rapid rate; and after the teeth of the cutter are brought into engagement with the surface of the main the boring bar together with the cutter and drill carried thereby are positively and automatically fed forwardly at a reduced speed so as to permit the cutter to cut slowly into the main.

My improved automatic feeding mechanism is, preferably, housed within the casing which carries the driving mechanism for rotating the boring bar so that the structure will be in compact form and damage to the feeding mechanism by dirt or the like gaining access thereto is guarded against.

A further object of this invention is to provide a feeding mechanism which is very simple in construction, positive in operation, and which may be readily and quickly changed to vary the rate of advancement of the boring bar.

The above and other objects of my invention are obtained in the structure described in the following specification and illustrated in the accompanying drawings, and in said drawings:—

Figure 1 is a view showing my improved tapping machine applied to a pipe or main, the casing which houses the driving mechanism and the feed change mechanism being shown in elevation and the remaining parts being shown in section for the purpose of clearness, Fig. 2 is an enlarged sectional view through the driving and feeding mechanisms and the shell cutter, this view being taken at right angles to that of Fig. 1, Fig. 3 is a sectional view taken on line 3—3 of Fig. 1 and shows the housing for the driving mechanism and feeding mechanism in elevation, Fig. 4 is a sectional view taken on line 4—4 of Fig. 2;

Fig. 5 is an elevational fragmentary end view of the feed latch of the feeding mechanism.

In the drawings, I have illustrated my invention as embodied in a tapping machine of the same general construction as that shown in the patents to A. W. Cash Nos. 1,094,425, dated April 28, 1914, and 1,216,284, dated February 20, 1917, but it is to be understood that my invention may be applied to drilling machines generally and that the present disclosure is illustrative only of my invention and is not restrictive thereof.

The frame of the tapping machine illustrated in the present embodiment of my invention comprises a body portion or base 10, a feed yoke 11 and a pair of standards or rods 12 secured at their opposite ends by means of nuts 13 to the feed yoke 11 and the body or base 10, respectively, for the purpose of connecting these members rigidly together. The body 10 is connected by means of a suitable reducer or adapter 14 to a casing 15 which houses a valve 16, a portion only of the latter being illustrated, as those familiar with this art will understand that this valve is for the purpose of shutting off the water after a hole has been formed in the pipe. The valve casing 15 is connected to the pipe 17 by the usual sleeve 18.

The body portion 10 is centrally apertured for the reception of a boring bar or cutter spindle 19 and the body 10 carries a packing gland 20 so as to prevent the escape of fluid from the valve casing. Interposed between the opposed surfaces of the bore of the body 10 and the boring bar 19 is a sleeve 21 of anti-friction material. The cutter shaft 19 which, in the present instance, is hollow, is adapted to receive on its inner end a shell cutter 22 which may be of any suitable construction. The diameter of the shell cutter will vary, of course, with the size of the branch pipe which is to be connected to the main 17.

The numeral 23 designates a pilot drill which, in the present instance, is secured within the bore of the spindle 19 by means of a screw 24. The pilot drill 23 extends beyond the plane of the cutting edges of the teeth of the shell cutter 22 so that the drill will bore a small hole centrally of the area of the main (which the shell cutter is to cut out) prior to the engagement of the cutting edges of the shell cutter with the main. The drill is provided with external threads 25 spaced somewhat from the free end of the drill and these threads are for the purpose of screwing into the opening made by the cutting edges of the drill so that after the cutter has cut through the pipe, the section cut out will be carried by the drill and can be withdrawn with the shell cutter into the casing 15 beyond the gate valve 16. The means for securing the shell cutter and drill to the boring bar 19 forms no part of the present invention.

The feed yoke 11 is centrally apertured for the reception of a feed screw 26. Relative longitudinal movement between the yoke and the screw is prevented by means of thrust collars 27 secured to the feed screw by pins 28 and mounted within recesses provided on the opposite faces of the feed yoke 11. The outer end of the feed screw 26 which protrudes beyond the yoke 11 is squared as at 29 for the reception of a removable handle 30. The handle 30 may be reversed so that the end thereof engages the yoke 11, as shown in dotted lines in Fig. 1, for the purpose of maintaining the feed screw against rotation during the boring operation. The inner end of the feed screw 26 extends into the through opening of the spindle 19, and this end of the feed screw is provided with a male screw thread 31 which engages the complemental internal screw thread 32 of the hollow cutter shaft or spindle 19 so that when the feed screw is rotated by means of the handle 30 or the boring bar 19 is rotated relative to the feed screw, the cutter shaft 19 together with the shell cutter 22 and the drill 23 are advanced toward or withdrawn from the main operated upon. An oil hole 33 in the wall of the spindle 19 may be provided to permit oiling of the threads 32.

The means for driving or rotating the boring bar 19 together with the drill and cutter carried thereby and the means for automatically and differentially rotating the feed screw upon rotation of the cutter shaft are housed within a casing 34 which is, preferably, formed of a plate portion 35 and a cap portion 36, which portions are detachably secured together by means of screws so that access may be readily had to the mechanisms carried thereby. The casing 34 has a pair of diametrically disposed ears 37 which are apertured to receive the standards 12, so that the casing 34 is guided by the standards. Within the casing or housing 34 and fixed to the boring bar 19 is a bevel gear 38 which meshes with the teeth of the driving gear 39. The axis of gear 39 is disposed at right angles to the gear 38 and its crank 40 is rotatably mounted in a bearing provided in the neck 41 of the casing. The outer end of the shank 40 is squared so as to receive a ratchet handle or one end of a flexible shaft, it being obvious that the tapping machine may be either manually operated or power driven.

Secured to the boring bar 19 and mounted within the casing 34 is a bevel gear 42 which forms part of the differential mechanism for automatically feeding the boring bar and cutter forwardly during the rotation of the boring bar. In the present instance, this gear is secured to the shaft 19 by a screw 43, but it is obvious that it may be secured thereto in any suitable manner and that, if desired, this gear may be integral with the gear 38 as both rotate about the same axis. This gear 42 meshes with an idler or pinion 44 which in turn meshes with a gear 45 secured against rotation to the casing 34 by means of a screw 46, although any other suitable securing means may be employed. The gear 45 is opposed to the gear 42 and it has an enlarged through opening for the reception of a hub or sleeve 48 which encircles the feed screw 26 and carries the pinion 44. The pinion 44 is secured to the sleeve 48 by means of the pin 49 which extends at right angles to the axis of rotation of the sleeve. The hub or sleeve 48 extends, at its outer end, beyond the casing so as to receive the latch or key mechanism for connecting the differential gearing to the feed screw 26.

In the present illustrated disclosure of my invention, the feed latch mechanism comprises a latch barrel 50 having a threaded nipple 51 so as to be screwed into the threaded recess 52 in the wall of the sleeve 48. As shown in Fig. 4 the inner wall of this recess 52 is slotted as at 53. Mounted within the barrel is a latch 54 which comprises a plunger having at its inner end a head 55 provided on its inner surface with a lug 56 which is adapted to extend through the opening 53 of the sleeve 48 and engage in a slot or channel 57 in the feed screw when the plunger 56 is turned into the proper position. As seen from Figs. 1 and 2, the slot 57 extends substantially throughout the entire length of the feed screw so as to permit movement of the casing 34 from the yoke 11 to the inner end of the feed screw.

The outer wall 58 of the cylinder or barrel 50 is apertured to form a bearing in which the plunger 54 may be longitudinally moved and this wall 58 serves as an abutment for one end of a coil spring 59 wrapped about the plunger and engaging its inner end against the head 55 so as to normally urge the latter toward the feed screw 26. The outer end of the barrel 50 is provided with a pair of cross grooves or notches 60 and 61, these notches being preferably disposed at right angles to each other. In the present instance, the notch 60 is deeper than the other notch. Extending diametrically through the plunger 54 is a pin 62 which, when the plunger is in one position will lie within the deeper groove 60, and when the plunger is withdrawn and turned through an angle of 90 degrees the pin 62 will engage in the slot 61 so as to maintain the lug 56 in withdrawn position and out of engagement with the groove 57 in the feed screw.

The operation of a tapping machine provided with my improvements will be readily understood. Assuming that the shell cutter 22 is in withdrawn position in the concavity of the adapter or reducer 14 and the tapping machine is properly secured to the main or pipe to which a branch is to be connected, to move the boring bar toward the pipe until the pilot drill 23 engages against the outer surface of the same, the handle 30 would be rotated and during the rotation of the handle, the latch 54 would be in withdrawn position with the pin 62 thereof in the groove or notch 61. During the rotation of the feed screw the boring bar 19 would be advanced at the rate of one thread for each rotation of the feed screw. After the point of the pilot drill has been brought into contact with the main to be cut, as shown in Fig. 1, the handle 30 is reversed upon the square portion 29 of the feed screw 26 so as to engage against the yoke 11 and maintain the feed screw against rotation, and the drive gear 39 is driven so as to rotate the gear 38 and the spindle 19 to which the gear 38 is secured. During this operation the latch 54 would be in withdrawn position so that the feed screw 26 would remain stationary and the cutter shaft 19 would rotate, and due to the rotation of the cutter shaft relative to the feed screw, the former would be fed forwardly at the rate of one thread for each revolution of the cutter shaft.

When the boring bar 19 has been advanced to a position in which the cutting edges of the teeth of the shell cutter 22 engage the external surface of the pipe or main to be cut, it may be necessary to reduce the rate of advancement of the cutter and for this purpose the handle 30 would be removed from the feed screw 26 or would be mounted therein in the manner shown in full lines in Fig. 1, so as to permit rotation of the feed screw, the plunger 54 would be withdrawn slightly so as to disengage the pin 62 from the notch 61 whereupon the plunger would be rotated through an angle of 90 degrees and released so that the pin 60 may engage in the deeper slot 62; the spring 59 would force the plunger 54 inwardly and since the lug 56 is then in registry with the opening 53, it would pass through the opening and engage in the groove 57 of the feed screw.

With the parts in this position, the sleeve 48 and the feed screw 26 will rotate in unison. The driving pinion 39 is driven to rotate the gear 38 and impart a rotary movement to the spindle or boring bar 19. Since the gear 42 is fixed to the boring bar 19 it will rotate therewith. As the pinion 44 meshes with the gear 42 and since the gear 45 is stationary, the pinion 44 will rotate about its own axis that is about the pin 49 and at the same time will have a planetary movement about the axis of rotation of the sleeve 48. The sleeve 48 is thus caused to revolve and the feed screw 26 will rotate in this case at one-half the speed and in the same direction as the boring bar 19. Since the boring bar in this case rotates twice as fast as the feed screw 26, the cutter 22 is advanced into the pipe at the rate of one-half thread for each revolution of the boring bar.

It is, of course, evident that my invention is susceptible to various modifications and changes which would be within the spirit of this invention without departing from the scope of the following claims.

What I claim is:

1. In a drilling machine, a cutter shaft, a feed member having a longitudinal groove, means between said shaft and member for causing longitudinal movement of the shaft when relative rotary movement is imparted to the shaft or feed member, means for rotating said shaft, a gear carried by said shaft and having the same axis of rotation, a sleeve loosely mounted about said feed member, a pinion carried by said sleeve and having its axis of rotation at right angles to the sleeve, a non-rotatable gear with which said pinion is in mesh, a latch carried by said sleeve and adapted to engage in said groove, and means for maintaining said latch out of engagement with said groove.

2. In a drilling machine, a cutter shaft, a feed member having a longitudinal groove, means between said shaft and member for causing longitudinal movement of the shaft when relative rotary movement is imparted to the shaft or feed member, means for rotating said shaft, a train of gears intermediate of the shaft and feed member including a sleeve loosely mounted about the feed member, a latch barrel carried by said sleeve and having a notch in its outer end, a spring pressed plunger in said barrel and adapted to engage at its inner end in said groove of the feed member, and a cross member on said latch adapted to engage in said notch when the sleeve is to be connected to said feed member, said cross member being adapted to lie transversely of said notch when the latch is in withdrawn position from said groove.

3. In a drilling machine, a cutter shaft, a feed screw having a longitudinal groove and threads in engagement with complementary screw threads of the cutter shaft for causing longitudinal movement of the shaft when relative rotary movement is imparted to the shaft or feed screw, means for rotating said shaft, a train of gears intermediate of the shaft and feed member including a sleeve loosely mounted about the feed member, a latch barrel carried by said sleeve and having two notches of different depths in its outer end, a longitudinally movable plunger in said barrel and adapted to engage at its inner end in said groove of the feed screw, a spring within said barrel for urging said plunger toward said feed screw, and a cross pinion on said latch adapted to engage in the deeper of said notches when the sleeve is to be connected to the said feed screw, said screw being adapted to lie in the other of said notches when the latch is in withdrawn position from said groove.

In testimony whereof I have hereunto set my hand.

GEORGE S. HALEY.